United States Patent [19]

Dedeian et al.

[11] 4,191,173
[45] Mar. 4, 1980

[54] SELF-HEATING CUP

[76] Inventors: John R. Dedeian, 1616 156th NE., #241, Bellvue, Wash. 98007; Charles Dedeian, 501, Soap Lake, Wash. 98851

[21] Appl. No.: 914,892

[22] Filed: Jun. 12, 1978

[51] Int. Cl.² ............................................. F24H 1/00
[52] U.S. Cl. ................................. 126/350 R; 126/265; 126/344; 126/373
[58] Field of Search .................. 126/350 R, 344, 261, 126/262, 265, 266, 246, 38, 40, 50, 373; 222/3; 431/344

[56] References Cited
U.S. PATENT DOCUMENTS

| 896,719 | 8/1908 | Gerbrecht et al. | 126/265 |
| 1,341,046 | 5/1920 | Davison | 126/44 |
| 3,080,861 | 3/1963 | Amero | 126/38 |
| 3,978,844 | 9/1976 | Wilkens | 126/38 |

FOREIGN PATENT DOCUMENTS 89733 12/1957 Sweden .................................... 126/44

Primary Examiner—Carroll B. Dority, Jr.
Assistant Examiner—Lee E. Barrett
Attorney, Agent, or Firm—Fred N. Schwend

[57] ABSTRACT

A cup formed of a cylindrical vessel and a hollow carrying handle attached to the vessel containing a liquid fuel reservoir from which fuel in a gaseous state is conducted to a burner located beneath a domed portion of the bottom wall of the vessel.

4 Claims, 6 Drawing Figures

U.S. Patent  Mar. 4, 1980  4,191,173
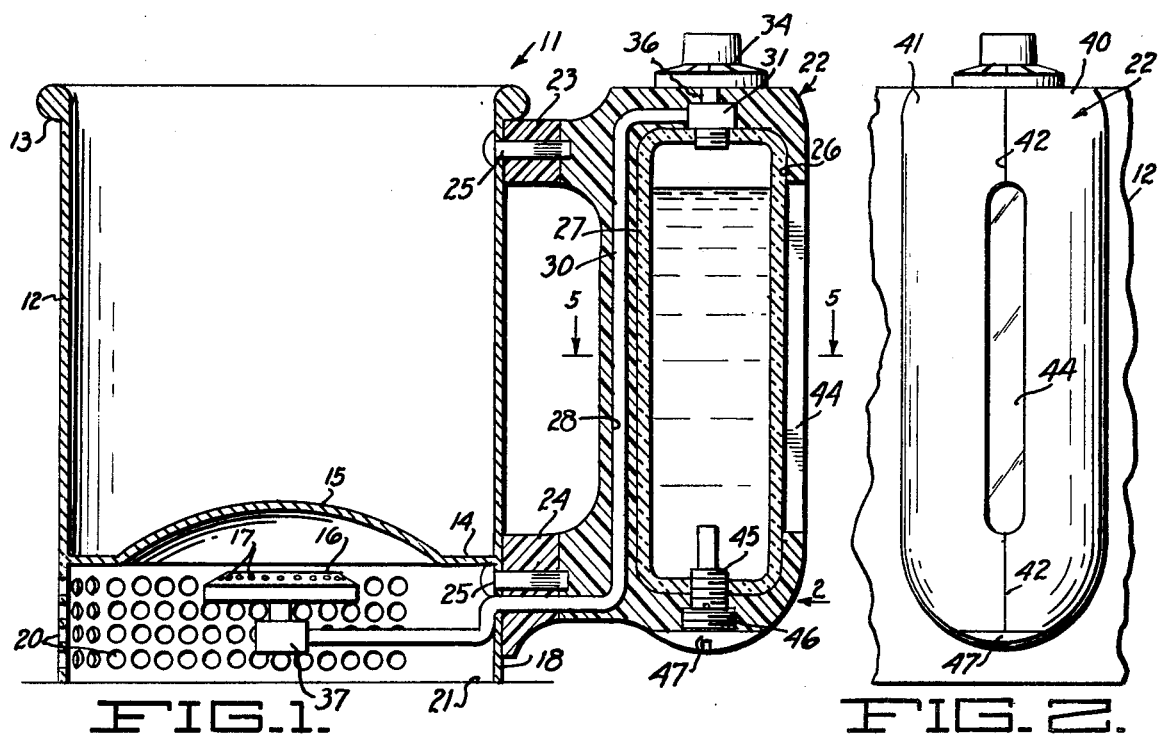
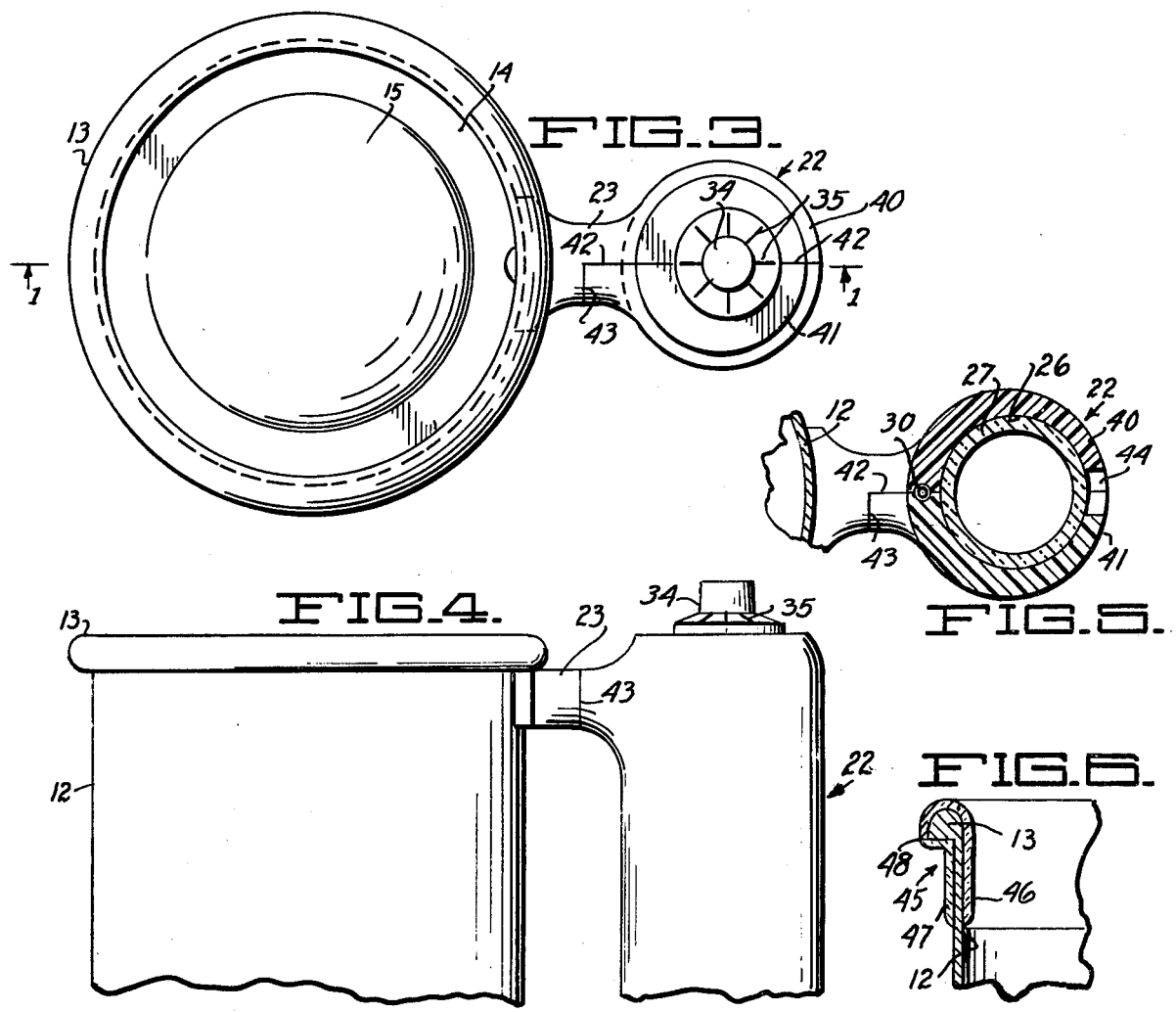

SELF-HEATING CUP

BACKGROUND OF THE INVENTION

1. Field of the Invention

This invention relates to self-heating containers for beverages and the like, such as coffee, tea, soups, etc., and has particular reference to a container in the form of a self-heating cup which may also be used for drinking purposes.

2. Description of the Prior Art

Self-heating cups have long been desired by travelers, outdoorsmen, sportsmen and others who do not always have the convenience of ready availability of electricity or other sources of heat whereby to heat beverages and other liquids and to maintain the same in heated condition until or while being consumed.

Attempts have been made in the past to provide such self-heating cups but in general they have been unsatisfactory. For example, the U.S. Pat. No. 2,893,376 to A. J. Pasqua discloses a self-heating cup wherein liquid fuel is contained within a combined reservoir and burner attached to the bottom of the cup. However, in order to prevent such cup from becoming unwieldy to handle, the base must be restricted in size so that only a small amount of liquid fuel can be contained therein. Also, such arrangement is considered hazardous since the highly volatile fuel is stored directly adjacent the burner.

The U.S. Pat. No. 3,978,844 to A. J. Wilkens discloses a self-heating cooking utensil in which liquid fuel is carried in a hollow handle which extends outwardly from the utensil. Although this arrangement may be satisfactory for cooking foods, it cannot be satisfactorily used as a drinking cup because of the displacement of the handle which would make it distinctly awkward and unsatisfactory to be held for drinking purposes. Further, although the liquid fuel container is located remotely from the burner, the fuel, which is normally stored in liquid form, would run directly to the burner in its liquid state and would therefore be burned in an inefficient and wasteful manner. Also, of course, heat from the burner could be conducted directly to the fuel container which is considered hazardous in view of the volatility of liquid fuels.

SUMMARY OF THE INVENTION

A principal object of the present invention is to provide a self-heating cup or the like having a handle which may be comfortably gripped and which contains liquid fuel within the handle.

Another object is to provide a self-heating cup which uses highly volatile liquid fuel, with means for protecting the fuel from the heat of combustion.

Another object is to provide a self-heating cup of the above type which utilizes a stored liquid fuel and wherein the amount of fuel remaining at any time may be readily ascertained.

Another object is to provide a self-heating cup of the above type utilizing a combustible liquid fuel which is simple and inexpensive to manufacture and assemble.

BRIEF DESCRIPTION OF THE DRAWINGS

The manner in which the above and other objects of the invention are accomplished will be readily understood on reference to the following specification when read in conjunction with the accompanying drawing, wherein:

FIG. 1 is a sectional view through a self-heating cup embodying a preferred form of the present invention and is taken substantially along the line 1—1 of FIG. 3.

FIG. 2 is an end view of the self-heating cup, with parts broken away, and is taken in the direction of arrow 2 in FIG. 1.

FIG. 3 is a top plan view of the self-heating cup.

FIG. 4 is a side elevational view partly broken away of the self-heating cup.

FIG. 5 is a sectional plan view of the cup handle and is taken along the line 5—5 of FIG. 1.

FIG. 6 is a fragmentary sectional view illustrating a modified form of the invention.

DETAILED DESCRIPTION OF THE PREFERRED EMBODIMENT

Although this invention is susceptible of embodiment in many different forms, there is shown in the drawings and will be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring to the drawing, the self-heating cup, generally indicated at 11, comprises a cylindrical metal vessel 12 for containing a beverage or other liquid to be heated or to be maintained at an elevated temperature. The upper end of the vessel has a rounded lip 13 formed thereon and the bottom wall 14 thereof has a centrally located upwardly bowed or concave portion 15 which is located directly over a burner unit comprising a gas burner 16, the latter having jet orifices 17 through which a combustible gas fuel is fed.

A metal skirt 18 having the same diameter as the vessel 12 is welded or otherwise integrally secured to the bottom wall 14 and has a plurality of small vent openings 20 extending therethrough to permit air heated by the burner 16 to vent outwardly to the atmosphere. The skirt 18 can also support the vessel 12 on a suitable supporting surface 21.

A vertically extending elongate handle 22 is provided for handling the cup for drinking purposes. The handle is formed of molded plastic or other heat insulating material and has upper and lower stand-offs or spacers 23 and 24, respectively, integrally molded therewith for attachment to the side of the vessel 12 by means of press-in rivets or pins 25. The spacers 23 and 24 maintain the handle 22 in spaced-apart relation to the vessel 12 so that the handle may be readily gripped by the user when drinking or pouring from the vessel.

As seen in the various figures, the handle 22 is hollow, having a substantially cylindrical shape and having a cylindrical cavity 26 therein to receive a close fitting transparent container 27 for liquid fuel, such as butane or propane stored therein under pressure.

A second cavity 28 for receiving a conduit tube is formed in the handle 22. The latter cavity extends mainly parallel to the length of the handle and receives a conduit tube 30, preferably of metal, which is connected at its upper end to a valve 31. The latter is screw threaded at 32 into the top of the container 27 to communicate the inlet thereof with the upper end of the conduit tube. A manually adjustable knob 34 having indicia graduations 35 formed thereon is located on top of the handle 22 and is connected by a short shaft 36 to the valve 31 whereby the user may control the flow of fuel to the burner 16.

The conduit tube 30 fits snugly within the cavity 28 and extends through the lower spacer 24 and into the center of the skirt 18 where it supports a suitable air mixing unit 37 which, in turn, supports the burner 16 in a position spaced below the domed portion 15 of the bottom wall 14 of the vessel 12.

The air mixing unit 37 forming part of the burner unit, may not be needed when using certain types of fuels, in which use, the conduit tube 30 may be used to directly support the burner 16.

The handle 22 is formed of two halves 40 and 41 which are joined together along a plane 42 (FIGS. 2 and 3) passing vertically through the center of the handle. However, the handle portion 41 extends only to a parting line 43. The two halves 40 and 41 are preferably cemented together with a suitable adhesive after the fuel container 27 and conduit tube 30 are assembled.

An elongated inspection slot 44 is formed in the wall of handle 22 through which the fuel content within the transparent container 27 may be readily viewed.

A suitable one-way fuel filling valve 45 is screw threaded into the lower end of the fuel container 27 and is accessible through an aligned opening 46 in the bottom of the handle 22 for the purpose of replenishing the container 27 with fuel by means of a suitable filler device, not shown. A protective screw cap 47 is screw threaded in the opening 46 in line with the filler valve 45 to protect the latter.

In use, liquid fuel, such as butane or propane, is injected into the container 27 under pressure through the filler valve 45 to a suitable level which may be readily ascertained by viewing the same through the slot 44.

When a liquid or semi-liquid placed in the vessel 12 is to be heated, the valve 31 is opened a desired amount by the knob 34, permitting the fuel in the upper end of the container 37, which has changed to a gaseous state, to be conducted through the conduit tube 30 to the burner 16. The gas exiting from the burner orifices 17 is suitably ignited and the resulting flame is directed upward against the domed portion 15 of the vessel wall 14, thereby heating particularly the central portion of the food or liquid contained in the vessel 12. Since the cup 11 is normally maintained in an upright position, the fuel will normally be conducted to the burner 16 in a gaseous state so that it will be burned in the most efficient and least wasteful manner. By adjusting the knob 34, the temperature of the vessel contents may be controlled and maintained as desired.

It will be noted that the vent openings 20 do not extend completely around the skirt 18 but terminate outside the area occupied by the handle 22 to protect the handle and the liquid fuel contained therein from the heating effects of the air being vented through such openings.

FIG. 6 illustrates a modified form of the invention in which an annular heat insulating cover 45 of thermo setting or thermo plastic material is mounted over the rim 13 of the vessel 12 to prevent heat transmitted through the wall of the vessel from burning one's lips while drinking from the cup.

The insulating cover 45 comprises an inner ring 46 snugly fitted against the inner surface of the vessel and over the vessel rim 13. An outer ring 47 is snugly fitted against the outer surface of the vessel and both rings are bonded to each other at 48 and to the vessel wall by a suitable adhesive.

From the foregoing, it will be observed that numerous variations and modifications may be effected without departing from the true spirit and scope of the novel concept of the invention. It is, of course, intended to cover all such modifications as fall within the scope of the appended claims.

I claim:

1. A self-heating drinking cup comprising
    an at least substantially cylindrical vessel for containing a beverage or the like,
    a lip protecting cover of heat insulating material surrounding the inner and outer surfaces of the upper portion of said vessel,
    said vessel having a bottom wall,
    a hollow elongate handle of heat insulating material extending parallel to the length of said vessel,
    spacing means of heat insulating material maintaining said handle in spaced apart relation to said vessel whereby said handle may be gripped to solely transport and pour or drink from said vessel,
    means forming a skirt below said bottom wall for supporting said vessel on an underlying surface,
    a burner,
    means supporting said burner within said skirt for applying heat against said bottom wall,
    an elongate container for fluid fuel within said hollow handle and extending along the length of said handle, and
    a fluid conduit extending from the upper end of said container,
    downwardly through said handle and through said spacing means to said burner.

2. A self-heating drinking cup as defined in claim 1 comprising manually adjustable valve means at the upper end of said handle for controlling flow of said fuel through said conduit, and indicia for indicating the adjustment of said valve means.

3. A self-heating drinking cup as defined in claim 1 wherein said fuel container is transparent,
    said handle having an elongate slot extending lengthwise therein whereby the fuel in said container may be viewed from outside said handle.

4. A self-heating drinking cup comprising
    a cylindrical vessel for containing a beverage or the like,
    said vessel having a bottom wall,
    an elongate handle of heat insulating material extending parallel to the length of said vessel,
    spacers of heat insulating material adjacent the top and bottom of said handle for mounting said handle to the side of said vessel in spaced apart relation to said vessel whereby said handle may be readily gripped to pour or drink said beverage from said vessel,
    said handle having first and second cavities extending lengthwise therethrough,
    an elongate transparent container for fluid fuel in said first cavity,
    said second cavity extending through the lower one of spacers,
    said handle having an elongate slot extending lengthwise therethrough whereby the fuel in said container may be viewed from outside said handle,
    means forming a skirt below said bottom wall for supporting said vessel over an underlying surface,
    a burner unit below said bottom wall, and
    a conduit member between the upper end of said container and said burner,
    said conduit member extending through said second cavity and said lower spacer and supporting said burner unit, and
    manually operable valve means at the upper end of said handle for controlling flow of said fluid fuel through said conduit member.

* * * * *